US008135483B2

(12) United States Patent
Miwa

(10) Patent No.: US 8,135,483 B2
(45) Date of Patent: Mar. 13, 2012

(54) EDITING DEVICE AND AUDIO SIGNAL PROCESSING DEVICE

(75) Inventor: Akihiro Miwa, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 555 days.

(21) Appl. No.: 12/415,866

(22) Filed: Mar. 31, 2009

(65) Prior Publication Data

US 2009/0248183 A1 Oct. 1, 2009

(30) Foreign Application Priority Data

Mar. 31, 2008 (JP) ................................ 2008-089311

(51) Int. Cl.
*G06F 17/00* (2006.01)

(52) U.S. Cl. ........................................................ 700/94

(58) Field of Classification Search .................... 700/94; 369/1-12; 381/119; 704/500-504
See application file for complete search history.

(56) References Cited

U.S. PATENT DOCUMENTS

| | | | | |
|---|---|---|---|---|
| 2006/0015200 | A1 * | 1/2006 | Takemura et al. | 700/94 |
| 2007/0061729 | A1 * | 3/2007 | Terada | 715/727 |
| 2007/0067055 | A1 * | 3/2007 | Terada | 700/94 |

FOREIGN PATENT DOCUMENTS

| | | |
|---|---|---|
| JP | 2005-234801 | 9/2005 |

* cited by examiner

*Primary Examiner* — Andrew C Flanders
(74) *Attorney, Agent, or Firm* — Morrison & Foerster LLP

(57) ABSTRACT

An editing device that edits a configuration of signal processing to be performed in a mixer engine having a programmable signal processor stores, for each of a plurality of mixer engines, resource data indicating a signal processing resource of a DSP of the mixer engine, accepts a selection of mixer engine which executes signal processing based on the edited configuration, assigns a resource of the DSP to a component and wire in the signal processing to be executed in accordance with the resource data of the mixer engine, with respect to each of all the selected mixer engines, and adds data indicating that the assignment is performed in accordance with the resource data of which model and data indicating an assignment result regarding each model to data indicating the configuration of signal processing.

8 Claims, 9 Drawing Sheets

EDITING DEVICE AND AUDIO SIGNAL PROCESSING DEVICE

BACKGROUND OF THE PRESENT INVENTION

1. Field of the Invention

The invention relates to an editing device for editing a configuration of signal processing to be performed in an audio signal processing device and the audio signal processing device that performs signal processing in accordance with the configuration of signal processing edited by the editing device.

2. Description of the Related Art

Conventionally, there has been known an audio signal processing device including an audio signal processor capable of operating in accordance with a program, and an external computer such as a PC (personal computer) is served as an editing device so that audio signals can be processed in the audio signal processing device based on a configuration of signal processing edited using the editing device. Such an audio signal processing device is called a mixer engine in the present application. The mixer engine stores therein the configuration of signal processing edited by the PC and can independently perform audio signal processing based on the stored configuration.

Besides, the edit of the configuration on the editing device has been performed such that components to be components for the signal processing and a wiring status between their input and output terminals are graphically displayed on a display in editing to allow users to perform editing work in an environment where the configuration of signal processing can be easily grasped visually. Then, a user can arrange desired processing components and set wires between the arranged components, thereby editing the configuration of signal processing.

The editing device and the mixer engine described above are disclosed in, for example, the following Document 1.

Document 1: Japanese Patent Laid-Open Publication No. 2005-234801.

The editing device disclosed in the Document 1 assigns, in accordance with a compiling instruction from a user, a resource of a DSP (digital signal processor) of a mixer engine connected to the editing device to components and wires included in the edited configuration, and notifies data on the assignment to the mixer engine. In accordance with the assignment, the mixer engine forms a microprogram with which respective processor units configuring the DSP execute processing relating to each of the components and wires based on the assignment data notified from the editing device. In addition, by making the DSP execute signal processing in accordance with the microprogram, the mixer engine can execute audio signal processing based on the configuration of signal processing edited by the user using the editing device within the capacity of the DSP.

SUMMARY OF THE INVENTION

Incidentally, when the editing device and the mixer engine disclosed in the Document 1 are applied and the configuration of signal processing to be executed by the audio signal processing device is changed, since the assignment of resource to the components and wires is conducted in the editing device, there is always a need to connect the editing device to the mixer engine.

For this reason, there is no idea to carry around only data regarding the configuration edited by the editing device separately from the editing device to set the data in various models of mixer engines and to make the mixer engines execute signal processing in accordance with the configuration. Accordingly, the editing device and the mixer engine disclosed in the Document 1 do not have suitable functions when being applied in the above case.

An object of the invention is to solve such problems and to enable, when an audio signal processing device having a programmable signal processor executes signal processing in accordance with a configuration edited by an editing device, data regarding the configuration generated by the editing device to be easily shared by a plurality of models of mixer engines. Further, it is also an object of the invention to enable the mixer engine to read the data regarding the configuration of signal processing and start the signal processing in a short period of time.

In order to achieve the above-described object, an editing device of the invention is an editing device that edits a configuration of signal processing including a plurality of components each having an input terminal or an output terminal and wires each connecting the output terminal and the input terminal of the components executed by an audio signal processing device having a programmable signal processor, the editing device including: a device that causes a display to display a screen with which the configuration is edited; a device that accepts a designation of the components and wires between the components on the screen and changes display contents of the screen in accordance with the designation; a first memory that stores data regarding the edited configuration as first configuration data including data on the components and wires included in the configuration; a second memory that stores, for each of a plurality of audio signal processing devices which execute the signal processing according to the edited configuration, resource data indicating a signal processing resource of the signal processor provided in the audio signal processing device; a selection accepter that accepts a selection of an arbitrary number of audio signal processing devices among the audio signal processing devices regarding which a piece of resource data is stored in the second memory; and a compilation device that assigns the signal processing resource of the signal processor of the audio signal processing device to processing corresponding to each of the components and wires included in the edited configuration in accordance with the resource data stored in the second memory, and generates second configuration data including not only the data on the components and wires but also assignment data indicating contents of the assignment and model data indicating that the assignment data is generated in accordance with the resource data of which device, wherein the compilation device individually generates, for each of all the audio signal processing devices regarding which the selection acceptor accepted the selection, the assignment data in accordance with the resource data of each of the devices and generates the second configuration data including all the pieces of the generated assignment data.

Alternatively, it is also preferable that the aforementioned editing device is provided with, instead of the above-described selection acceptor, a selection accepter that accepts a selection of an arbitrary number of audio signal processing devices among the audio signal processing devices regarding which a piece of resource data is stored in the second memory, and provided with, instead of the above-described compilation device, a compilation device that generates the assignment data in accordance with the resource data of the audio signal processing device regarding which the selection accepter accepted the selection, and generates the second configuration data including the assignment data.

An audio signal processing device of the invention is an audio signal processing device having a programmable signal processor and performing signal processing on inputted audio signals in accordance with the second configuration data generated by the above-described editing device to output the processed signals, the audio signal processing device including: a configuration data memory that obtains and stores the second configuration data; a program memory that stores a program for making the programmable signal processor perform signal processing corresponding to each of components used in editing the signal processing in the editing device; and a controller that controls the signal processing in the programmable signal processor based on one piece of the second configuration data stored in the configuration data memory, wherein the controller including: an assignment data selecting device that selects, in accordance with model data included in the second configuration data used for controlling the signal processing, assignment data indicating contents of assignment in accordance with resource data indicating a signal processing resource of the programmable signal processor of the audio signal processor itself among assignment data included in the second configuration data; a program forming device that forms a program for making the programmable signal processor perform, using the signal processing resource indicated by the assignment data selected by the assignment data selecting device, signal processing according to the configuration data based on the program stored in the program memory; and a device that makes the programmable signal processor execute the program formed by the program forming device.

In such an audio signal processing device, it is preferable that the audio signal processing device further includes: a resource data memory that stores the resource data indicating the signal processing resource of the programmable signal processor of the audio signal processing device itself; a second compilation device that assigns, when the assignment data indicating the contents of assignment in accordance with the resource data indicating the signal processing resource of the programmable signal processor of the audio signal processing device itself cannot be selected by the assignment data selecting device, the signal processing resource of the programmable signal processor of the audio signal processing device itself to processing corresponding to each of components and wires indicated by the data on the components and wires included in the second configuration data in accordance with the resource data stored in the resource data memory and generates assignment data indicating contents of the assignment; and a device that makes the program forming device form the program based on the assignment data generated by the second compilation device.

Further, it is also preferable that the audio signal processing device further includes a device that adds, when the second compilation device generates the assignment data, the generated assignment data to the second configuration data used for controlling the signal processing and adds data regarding the audio signal processing device itself to the model data included in the second configuration data.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, preferred embodiments of the invention will be concretely described with reference to the drawings.

Figure 1:
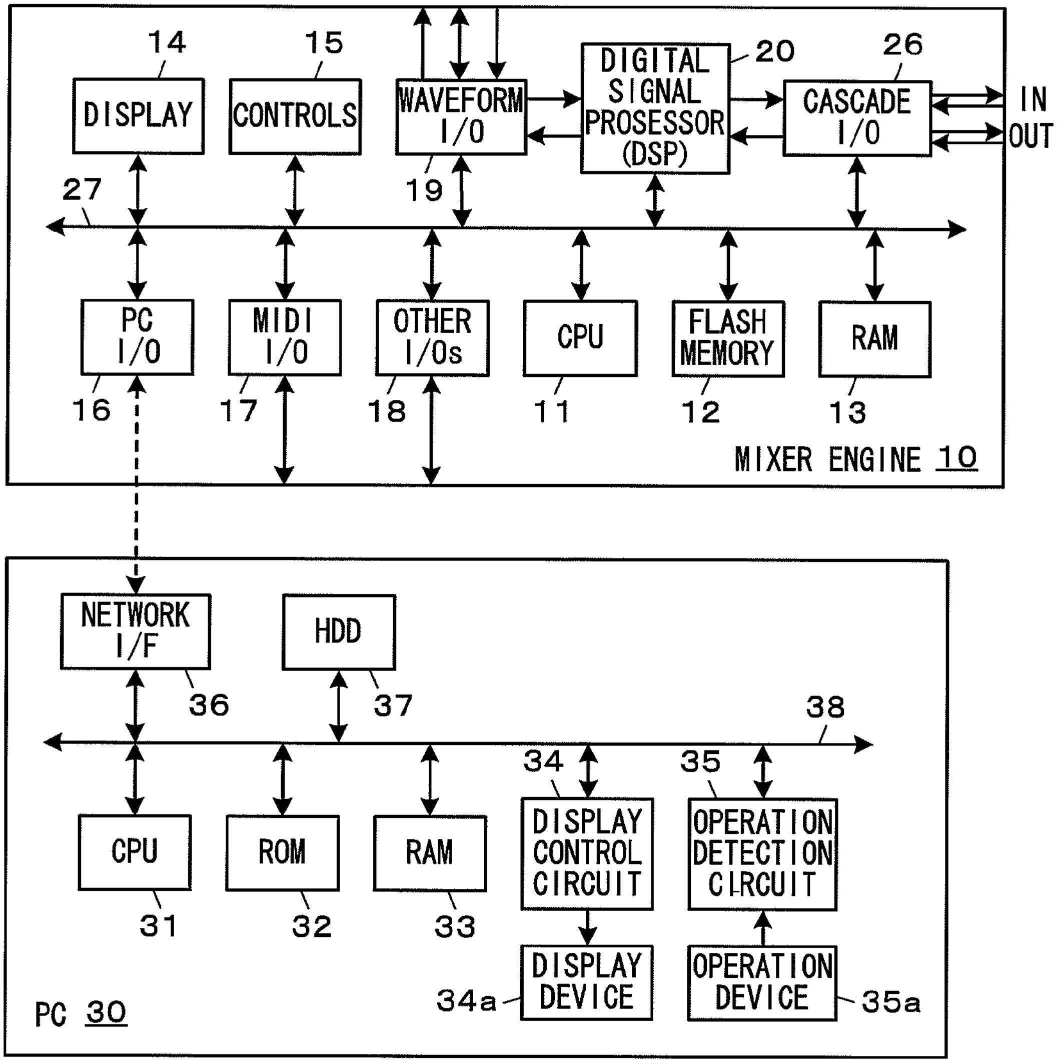
FIG. 1 is a block diagram showing a configuration of a mixer system being an audio signal processing system composed of a PC as an embodiment of an editing device of the invention and a mixer engine as an embodiment of an audio signal processing device of the invention.

First, a configuration of a mixer system being an audio signal processing system composed of a PC being an embodiment of an editing device of the invention and a mixer engine being an embodiment of an audio signal processing device of the invention will be described using FIG. 1. FIG. 1 is a block diagram showing the configuration of the mixer system.

As shown in FIG. 1, the mixer system is composed of a mixer engine 10 and a PC 30. Note that each of the mixer engine 10 and the PC 30 can also be operated independently. Further, it is also possible to operate each of the mixer engine 10 and PC 30 while connecting different devices thereto according to need.

The PC 30 can employ, as hardware, a well-known PC on which an operating system (OS) such as Windows XP (registered trademark) runs.

For instance, as shown in FIG. 1, the PC 30 can be configured such that it includes a CPU 31, a ROM 32, a RAM 33, a display control circuit 34, an operation detection circuit 35, a communication interface (I/F) 36 and an HDD (hard disk drive) 37 which are connected by a system bus 38.

Among the above, the display control circuit 34 is a circuit for controlling a display on a display device **34*a* such as a display, and the operation detection circuit 35 is a circuit for detecting an operation at an operation device 35*a*** such as a keyboard and a mouse.

With the use of these circuits, the PC 30 can show information to a user and accept an operation from the user. Note that it is of course possible to use devices external of the PC 30 as the display device and the operation device.

The communication I/F 106 is an interface for communicating with an external device including the mixer engine 10.

In the PC 30 described above, by making the CPU 31 execute an appropriate edit program stored in the ROM 32 or the HDD 37 as an application program on the OS, the PC 30 can serve as an editing device editing a configuration of signal processing to be executed by the mixer engine 10 and making the mixer engine 10 operate in accordance with the edited configuration. The operation and function of the PC 30 described below are realized by executing the edit program unless otherwise stated.

Meanwhile, the mixer engine 10 includes a CPU 11, a flash memory 12, a RAM 13, a display 14, controls 15, a PC input/output module (I/O) 16, a MIDI (Musical Instruments Digital Interface: trademark) I/O 17, other I/Os 18, a waveform I/O 19, a digital signal processor (DSP) section 20 and a cascade I/O 26 which are connected by a CPU bus 27. The mixer engine 10 has functions of generating a microprogram for controlling the DSP section 20 in accordance with data regarding the configuration of signal processing received from the PC 30 or read from a portable memory, and operating the DSP section 20 in accordance with the microprogram to thereby perform various kinds of signal processing on inputted audio signals and output them. The portable memory described here indicates a detachable non-volatile memory such as, for instance, a USB memory or an SD memory card.

The CPU 11, which is a controller that comprehensively controls operation of the mixer engine 10, executes a predetermined program stored in the flash memory 12 to thereby perform processing such as controlling communication at each of the I/Os 16 to 19 and 26 and display on the display 14, detecting operations at the controls 15 and changing values of parameters in accordance with the operations, and generating the microprogram for operating the DSP section 20 in accordance with data on the configuration of signal processing received from the PC 30 or read from the portable memory and installing the program into the DSP section 20.

The flash memory 12 is a rewritable non-volatile memory that stores a control program executed by the CPU 11, later-described preset component data and so on.

The RAM 13 is a memory that stores various kinds of data including later-described configuration data generated by converting the data on the configuration of signal processing received from the PC 30 into a required form and current data, and is used as a work memory by the CPU 11.

The display 14 is a display composed of a liquid crystal display (LCD) or the like. The display 14 displays a screen for indicating the current state of the mixer engine 10, a screen for referring to, changing, saving, and so on of scenes being setting data contained in the configuration data, and so on.

The controls 15 are controls composed of keys, switches, rotary encoders, and so on, with which a user directly operates the mixer engine 10 to edit scenes and so on.

The PC I/O 16 is an interface for connecting with the PC 30 to communicate with it, and can be an interface of, for example, a USB (Universal Serial Bus) standard, an RS-232C standard, an IEEE (Institute of Electrical and Electronic Engineers) 1394 standard, an Ethernet (registered trademark) standard, or the like.

The MIDI I/O 17 is an interface for sending/receiving data in compliance with MIDI standard, and is used, for example, to communicate with an electronic musical instrument compatible with MIDI, a computer with an application program for outputting MIDI data, or the like.

The waveform I/O 19 is an interface for accepting input of audio signals to be processed in the DSP section 20 and outputting processed audio signals. A plurality of A/D conversion boards each capable of analog input of four channels, D/A conversion boards each capable of analog output of four channels, and digital input/output boards each capable of digital input/output of eight channels, can be installed in combination as necessary into the waveform I/O 19, which actually inputs/outputs signals through the boards.

The cascade I/O 26 is an interface for sending/receiving, when a plurality of mixer engines 10 are used by being cascade-connected, audio signals, control signals or the like among the mixer engines. Note that when the plurality of mixer engines 10 are cascade-connected to be used, it is possible to cooperatively operate the plurality of mixer engines 10 to perform a series of audio signal processing. Further, it is also possible to edit the configuration of such audio signal processing in the PC 30. In this case, data indicating the configuration is loaded into either of the mixer engines 10 and the data is transferred to the other mixer engines 10, to thereby operate the respective mixer engines 10 in accordance with the edited configuration of signal processing.

The other I/Os 18 are interfaces for connecting devices other than the above to perform input/output, and for example, interfaces for connecting a display, a mouse, a keyboard for inputting characters, a control panel, and so on in an external part are prepared. Further, an interface for connecting the portable memory is included in the other I/Os 18.

The DSP section 20 is a signal processor section which includes a signal processing circuit to perform signal processing on audio signals inputted from the waveform I/O 19 in accordance with the installed microprogram and the current data determining its processing parameters.

Figure 2:
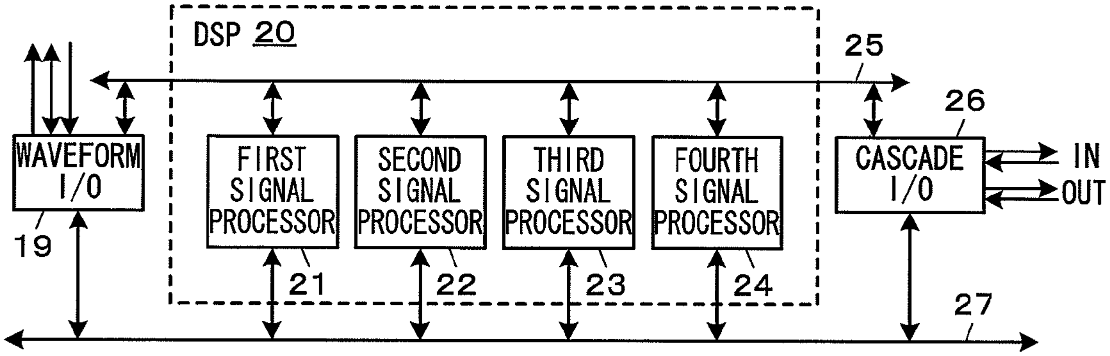
FIG. 2 is a diagram showing a configuration of a DSP shown in FIG. 1 and a periphery thereof in more detail.

The configuration of the DSP section 20 and its periphery is shown in more detail in FIG. 2.

The DSP section 20 may be constituted of one processor or a plurality of processors being connected with one another, and in this case, it is constituted of four, that is, a first to a fourth signal processors 21 to 24 connected as shown in FIG. 2. Further, the respective signal processors, the waveform I/O 19 and the cascade I/O 26 are connected to a waveform bus 25 to transfer the signal being a processing target via the waveform bus 25.

The waveform bus 25 is capable of transmitting 128 channels of 24-bit signals on a time division basis, and each channel functions as a signal transmission path for transmitting a signal from the output of either of the signal processors or the I/Os connected to the waveform bus 25 to the input of another signal processor or I/O. Specifically, the channels are assigned to the output side and the input side, and the output of each of the signal processors and I/Os outputs a signal to the channel assigned thereto as the output destination and the input of each of the signal processors and I/Os fetches the signal from the channel assigned thereto as the input source to thereby enable transmission of the signal.

Further, an assignment of signal processing resource in the DSP section 20 such that processing corresponding to each component in the configuration of signal processing edited by the PC 30 is executed by which signal processor and data between each of the signal processors and I/Os is transferred by using which channel, is basically performed on the PC 30 side, but, it can be performed also on the mixer engine 10 side according to need.

Figure 3:
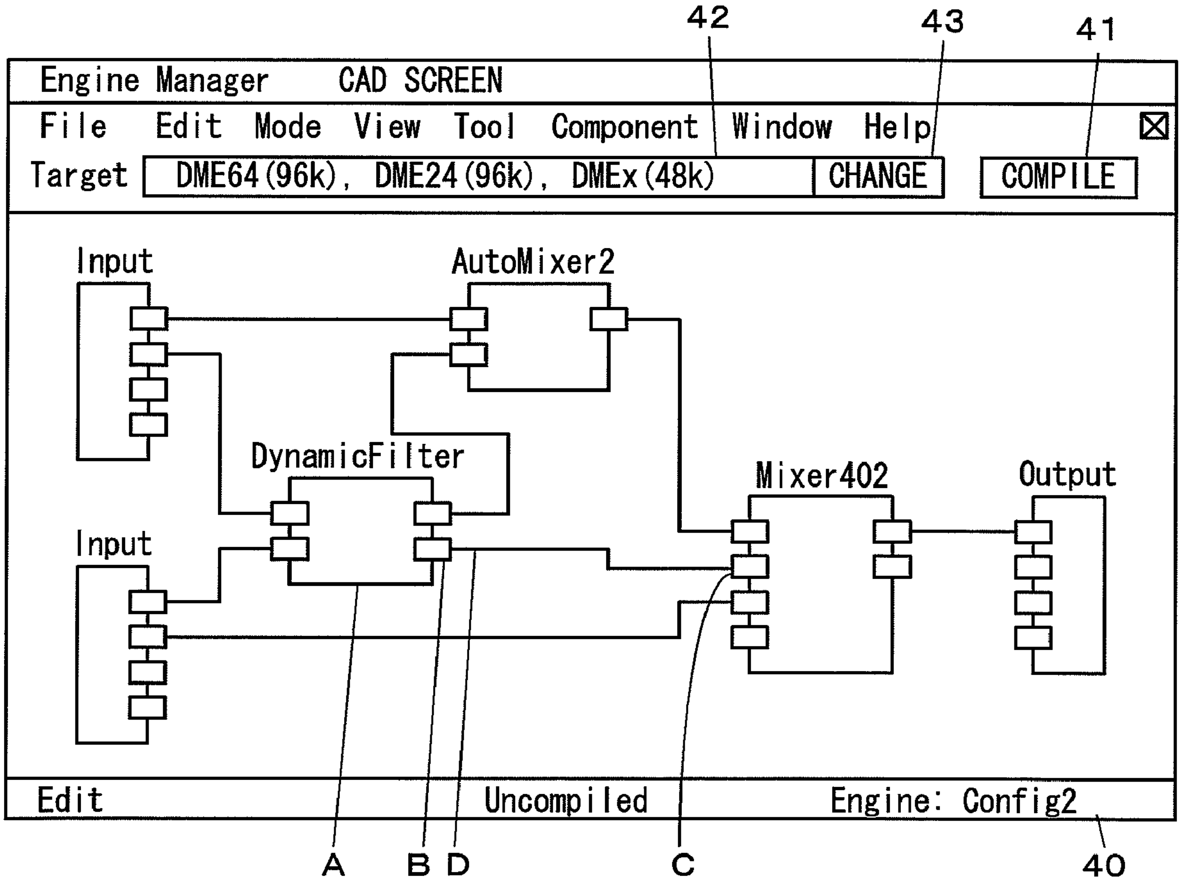
FIG. 3 is a diagram showing an example of an edit screen for editing a configuration of signal processing to be displayed on a display of the PC shown in FIG. 1.

Next, an editing scheme of the configuration of signal processing in the PC 30 will be described. FIG. 3 is a diagram showing an example of an edit screen for editing the configuration to be displayed on the display of the PC 30.

When a user causes the PC 30 to execute the above-described edit program, the PC 30 causes the display to display a CAD (Computer Aided Design) screen 40 as shown in FIG. 3 to accept an edit instruction from the user. On this screen, the configuration of signal processing during the edit is graphically displayed by components (A) such as a DynamicFilter, an AutoMixer2, a Mixer402 and the like and wires (D) connecting output terminals (B) and input terminals (C)

of the components. Note that the terminals illustrated on the left side of the components are the input terminals, and the terminals illustrated on the right side are the output terminals. The components which exhibit input to the mixer engine 10 have only the output terminal(s), the components which exhibit output from the mixer engine 10 have only the input terminal(s), and all the other components have both the input terminal(s) and the output terminal(s).

On this screen, the user can select components which the user desires to add to the configuration, from a component list displayed by operation of a "Component" menu, arrange them on the screen, and designate wires between any of the output terminals and any of the input terminals of the plurality of the arranged components, to thereby edit the configuration of signal processing. In this case, display contents of the CAD screen 40 are changed in accordance with the edit operation as a matter of course.

The configuration edited as above can be saved as later-described configuration data by selecting "Save" in a "File" menu.

When the component is newly disposed in the configuration of signal processing, a storage region for storing parameters of the component (for example, the level of each input or the like if it is a mixer) is prepared in the current memory, and predetermined initial values are given for the parameters.

Then, the user can edit the parameters stored in the parameter storage region by operating a parameter control panel provided for each component. Further, a plurality of resultant parameters edited here and stored in the current memory are stored in the later-described configuration data as scenes, so that the parameters can be arbitrarily recalled to be reflected on the signal processing operation when the mixer engine 10 performs signal processing in accordance with the edited configuration of signal processing.

Further, a compile button 41 is provided on the CAD screen 40, and when the compile button 41 is clicked, an assignment of various capacities, namely, various resources of the signal processor included in the DSP or the like of the mixer engine is performed on each of the components and wires included in the configuration of signal processing at that moment. This assignment is a processing in which an assignment of signal processing resource (DSP, processing step, resister, memory and the like) in the mixer engine to the respective components included in the configuration of signal processing, an assignment of signal transmission resource (resister, memory, transmission channel and the like) to the respective wires included in the configuration, and the like are concretely determined.

As matters to be determined here, following matters are conceivable, that is, by which processor among the signal processors included in the mixer engine and using which processing step during one sampling period the processing corresponding to each component and wire is executed; which address range in the memory is to be used for the processing; via which transmission channel (or which resister) of the waveform bus the waveform data after the processing corresponding to a certain component is to be passed to a processor which performs processing corresponding to the next component; and the like.

Such an assignment processing is called "compilation" of the configuration of signal processing.

Further, since usable hardware resources are different depending on a model, an operation mode, an option construction and the like of the mixer engine, it is made possible to select, on the CAD screen 40, to perform the compilation by setting which condition as a target when the compile button 41 is clicked.

Conditions currently selected as the targets are displayed on a target display portion 42, and as seen from the drawing, a plurality of conditions, not only one condition, can be selected as well. A change button 43 is a button for displaying a target selection screen on which a selection state of the target is changed.

Figure 4:
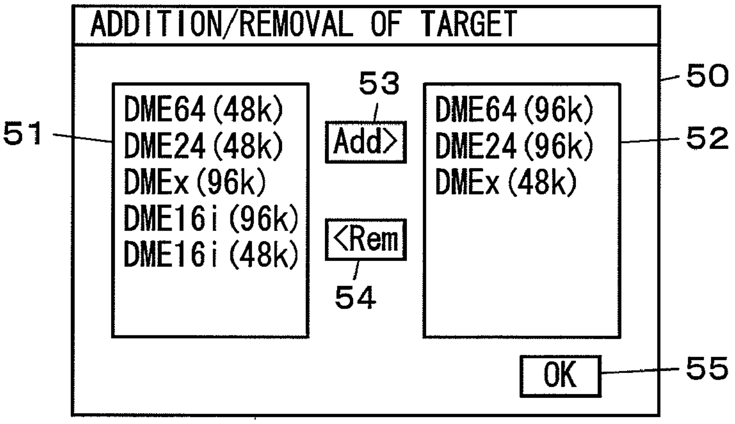
FIG. 4 is a diagram similarly showing a display example of a target selection screen.

FIG. 4 shows a display example of the target selection screen.

As shown in the drawing, a target candidate display portion 51 and a selected target display portion 52 are included in the target selection screen 50. The target candidate display portion 51 displays unselected conditions which can be selected as targets, and the selected target display portion 52 displays conditions currently selected as the targets. Here, these conditions are specified by a model and a sampling frequency of a signal to be processed.

For example, "DME64(48 k)" indicates that a mixer engine of a model of DME64 is made to perform processing on an audio signal whose sampling frequency is 48 kilohertz. Further, "DME64(96 k)" indicates that a mixer engine of a model of DME64 is made to perform processing on an audio signal whose sampling frequency is 96 kilohertz. Even if mixer engines are of the same model, when the sampling frequency of the signal to be processed is different, the number of processing steps capable of being executed by each processor during one sampling period is different, so that the number of processing steps assignable to signal processing components is different. For this reason, even if the mixer engines are of the same model, there are prepared different conditions for each sampling frequency of the signal to be processed.

On the target selection screen 50, by designating a condition displayed on the target candidate display portion 51 and clicking an addition button 53, the user can move the condition to the selected target display portion 52 so that the condition is selected as a target. On the other hand, by designating a condition displayed on the selected target display portion 52 and clicking a delete button 54, the user can move the condition to the target candidate display portion 51 so that the selection of the condition is canceled.

When an OK button 55 is clicked, the PC 30 decides the selection of target made on the target selection screen 50, and reflects the selection on the display on the target display portion 42.

Further, when the compile button 41 is clicked, the PC 30 performs the compilation with respect to each of all the conditions selected as targets at that moment, based on one condition by one condition. Subsequently, the PC 30 generates a piece of data indicating the result of compilation for each condition used for the compilation, and generates an archive file in which the respective pieces of generated data and data regarding the configuration of signal processing are provided as a set. This point will be described later in detail.

The configuration of data relating to the invention for use in the above-described mixer system will be described below.

Figure 5:
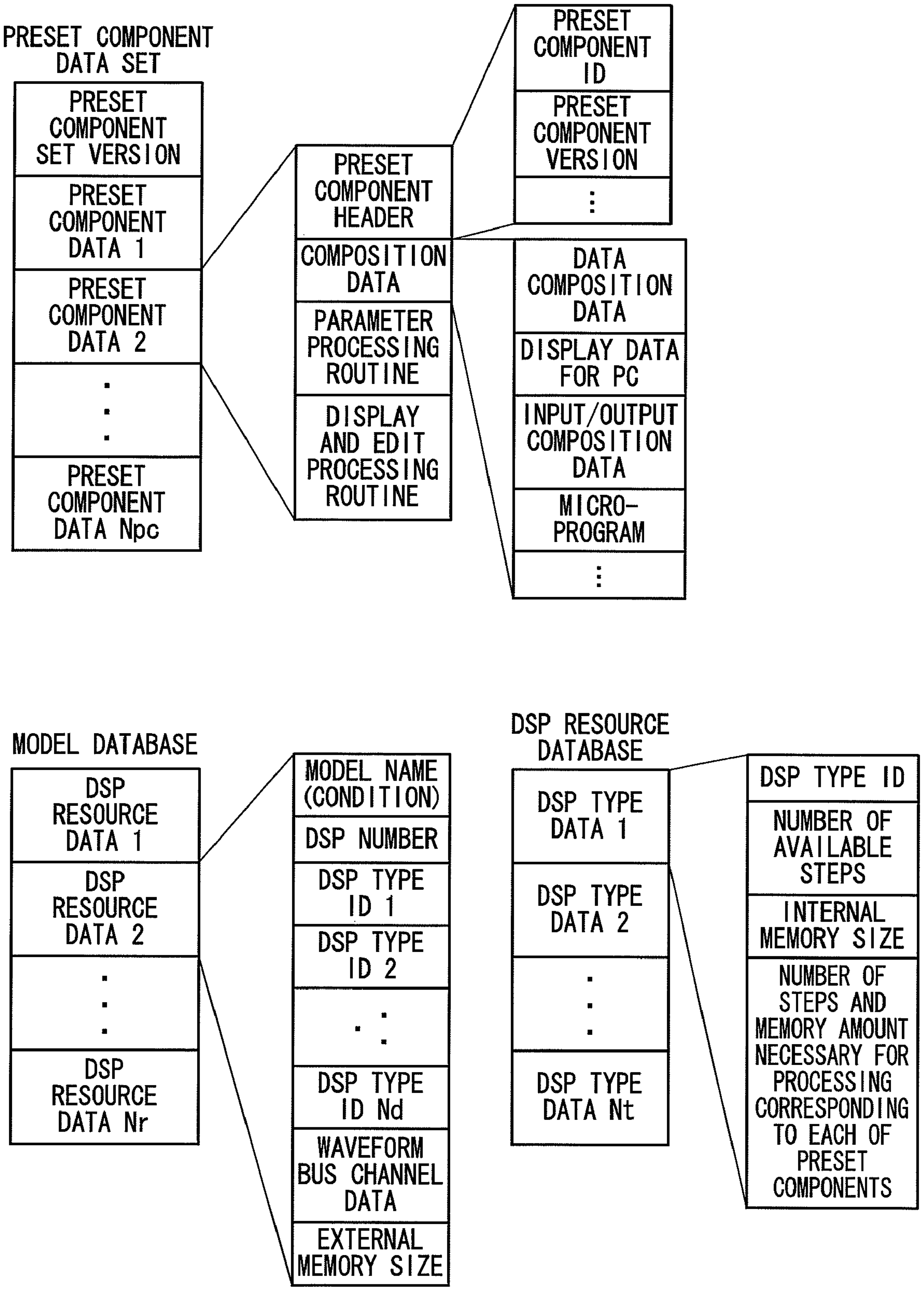
FIG. 5 is a diagram showing a configuration of data to be used on the PC side among data relating to the invention.
Figure 6:
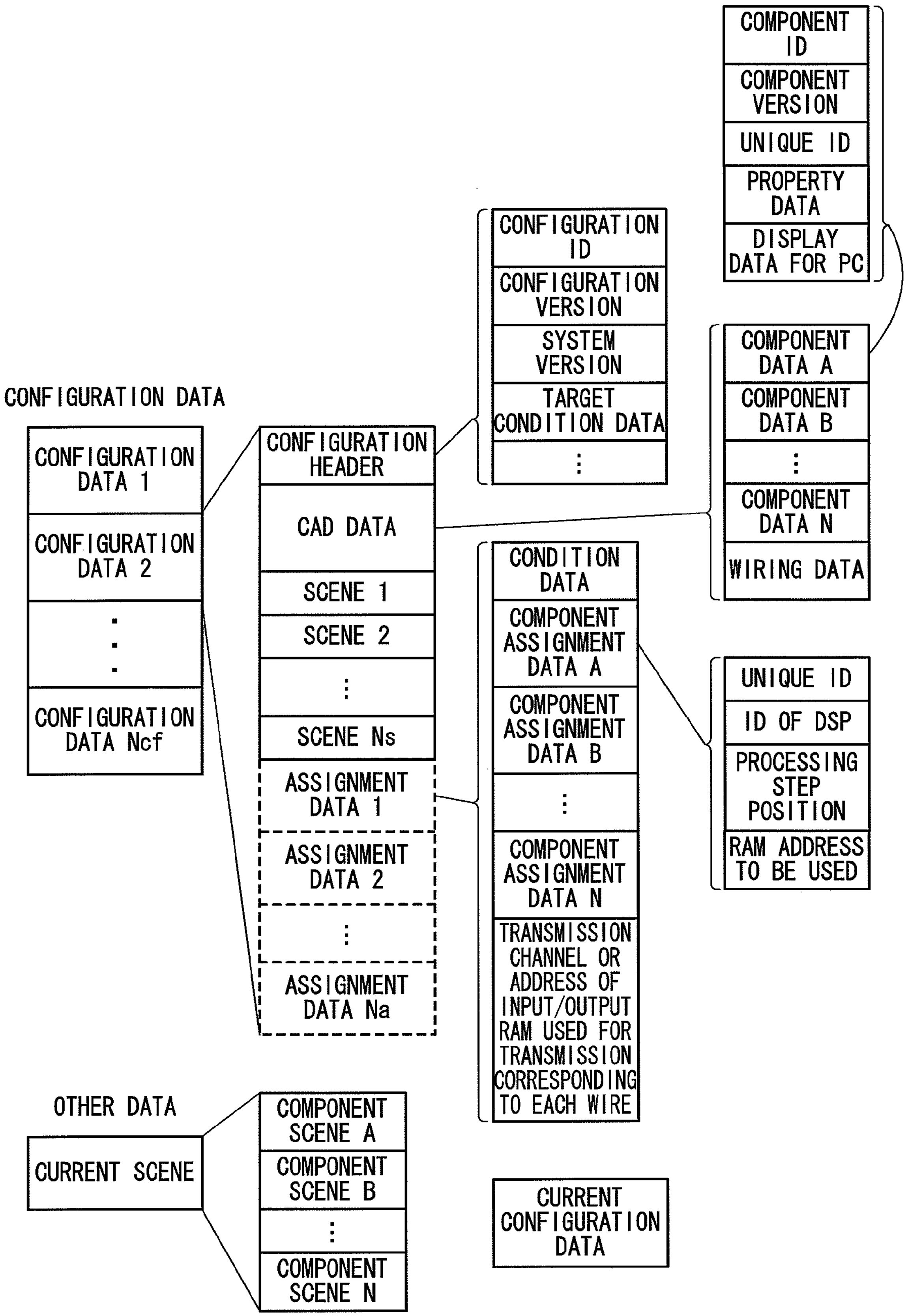
FIG. 6 is a diagram similarly showing a configuration of another data to be used on the PC side.

First, the configuration of data for use on the PC 30 side will be shown in FIG. 5 and FIG. 6.

When the above-described edit program runs on the OS of the PC 30, the PC 30 stores a preset component data set as shown in FIG. 5 in a memory space specified by the edit program. Further, a model database, a DSP resource database and configuration data shown in FIG. 6 are also stored in a position at which the data can be referred to according to need.

Among the above, the preset component data set is a set of data of components which can be used in editing the configuration of the signal processing and basically supplied from its manufacturer, although it may be configured to be customizable by the user. The preset component data set includes preset component set version data for managing the version of the whole data set and preset component data prepared for each kind of the plurality of components constituting the data set.

Each preset component data, which is data indicating the property and function of a component, includes: a preset component header for identifying the component; composition data showing the composition of the input and output of the component and data and parameters that the component handles; a parameter processing routine for performing processing of changing the value of individual parameters relating to each component in the above-described current memory in accordance with an input number operation by the user; and a display and edit processing routine for converting the parameters relating to each component in the current memory into text data or a characteristic graph for display.

Among the above, the preset component header includes data regarding a preset component ID indicating the kind of the preset component and a preset component version indicating its version, with which the preset component can be identified.

The composition data includes display data for PC indicating color and shape when the component itself is displayed on the edit screen, the design of the control panel displayed on the display for editing the parameters of that component, and the arrangement of knobs and the characteristic graph on the control panel, as well as the input/output composition data indicating the composition of the input/output of the component, and the data composition data indicating the composition of data and parameters handled by the component. Further, the composition data also includes the microprogram for realizing signal processing relating to the relevant component by operating the DSP section 20 in the mixer engine.

Note that although the microprogram is not particularly used on the PC 30 side, the preset component data including the microprogram is stored on the PC side so that the common preset component data can be used also on the mixer engine 10 side.

The model database is a database storing, for each condition which can be selected at the time of the compilation regarding the configuration of signal processing, DSP resource data indicating a resource of the DSP section 20 assignable to signal processing under each of the condition. Although the term "model" is used here, even in the mixer engines of the same model, the assignable signal processing capabilities may vary depending on conditions, as has already been described above. Accordingly, there may exist a plurality of pieces of DSP resource data for one model. The model database and the DSP resource database to be described next are pieces of data prepared by a manufacturer of the edit program of the mixer engine.

The respective pieces of DSP resource data include a model name, a DSP number, a DSP type ID, waveform bus channel data and an external memory size.

Among the above, the model name is data indicating to which model the DSP resource data relates. When it is required to distinguish the pieces of DSP resource data based on the sampling frequency of signals, option construction or the like, data relating thereto is also described in the model name.

The DSP number is data indicating how many signal processors exist in the DSP section 20 of the relevant model. The DSP type ID is data specifying the type of each processor, and by referring to the DSP resource database using the DSP type ID as a key, it is possible to obtain further detailed information on each processor included in the DSP section 20. Note that when assignable resources vary even in the same processors because of the condition such as the sampling frequency of signals, different DSP type data is prepared for each of the conditions, and different IDs are assigned to each of those DSP type data.

The waveform bus channel data is data indicating the type of waveform transmission path included in the DSP section 20 of the relevant model and how many channels of waveform data can be transmitted via the waveform transmission path during one sampling period. As the type of waveform transmission path, a parallel bus, a serial bus or the like can be cited. Further, as the number of channels, it is conceivable to describe how many channels of signals can be transmitted between which DSP and which DSP among the DSPs to which the DSP type IDs are assigned. It is also conceivable to describe how many channels of signals can be transmitted between any DSPs in a group consisting of a plurality of particular DSPs. In either case, a description method in accordance with a wiring between actual DSPs can be adopted.

The external memory size indicates a size of memory provided external of the DSP and available from the DSP for the signal processing.

The DSP resource database is a database storing DSP type data indicating the signal processing capacity of each of the various types of signal processors which can be provided in the DSP section of the mixer engine.

The respective pieces of the DSP type data include a DSP type ID, the number of available steps, an internal memory size, and data on the number of steps and the memory amount necessary for processing corresponding to each of the preset components, and the DSP type data indicate, for each signal processor corresponding to each DSP type ID, contents of hardware resource of the DSP.

Concretely, the number of available steps is the number of steps assignable to the signal processing components for use in execution of the signal processing relating to the components, among the steps executable by the DSP during one sampling period.

The internal memory size is a size of memory embedded in the processor and available from the DSP for the signal processing.

The number of steps and the memory amount necessary for the processing are pieces of data indicating the number of processing steps and the memory amount required when the DSP executes signal processing corresponding to each of the preset components. Note that when the version of the preset component differs, the contents of microprogram for executing the processing corresponding to the component may also differ, resulting that the number of processing steps and the memory amount necessary for the processing differ. Accordingly, the data is provided for each version of the preset component.

Further, even when the processing corresponding to the same preset component is conducted, if structures of the processors are different, the contents of microprogram used for executing the processing may differ. For this reason, the data on the number of steps and the memory amount necessary for the processing is prepared for each of the types of DSP.

The model database and the DSP resource database correspond to the resource data, and a memory storing the data is a second memory.

Each configuration data is data indicating contents of the configuration of signal processing edited by the user and, when editing the configuration, the CPU of the PC 30 reads out one of the stored configuration data or newly creates a configuration data, and performs edit on the read configuration data. The configuration data under the edit is stored separately as current configuration data. Further, when the user selects to save the edit result, the configuration of signal processing, set values of the parameters and so on at that moment are saved as a piece of configuration data.

Each configuration data includes a configuration header for identifying the configuration data, CAD data indicating contents of the edited configuration of signal processing and scenes being the above-described setting data.

Among these, the configuration header includes a configuration ID uniquely assigned when the configuration data is newly saved, a configuration version indicating a changed version of the configuration data when the data is changed, a system version indicating a version of an edit program with which the configuration data is edited, data relating to condition(s) (a model, a sampling frequency and the like) selected as a target at the time of compilation, and so on.

The CAD data includes component data on each component included in the edited configuration and wiring data indicating a wiring status between the components. Note that if a plurality of preset components of the same kind are included in the configuration of signal processing, discrete component data is prepared for each of them.

Each component data includes: a component ID indicating which preset component the relevant component corresponds to; a component version indicating which version of preset component the relevant component corresponds to; a unique ID being an ID uniquely assigned to the relevant component in the configuration in which that component is included; property data including data regarding the number of input terminals and output terminals of the relevant component and so on; and display data for PC indicating the position where the corresponding component is arranged in the edit screen on the PC 30 side and so on.

The wiring data includes, for each wire among a plurality of wires included in the edited configuration: connection data indicating which output terminal of which component is being wired to which input terminal of which component; and display data for PC indicating the shape and arrangement of that wire in the edit screen on the PC 30 side.

The CAD data is first configuration data, and a memory storing the data is a first memory.

Each scene is an aggregate of component scenes being parameters relating to each component in the configuration indicated in the CAD data. The format and arrangement of data in each component scene are defined by the data composition data in the preset component data of the preset component specified by the component ID and the component version of the relevant component included in the CAD data.

When the execution of compilation is instructed by a click of the compile button 41, the PC 30 creates assignment data concretely indicating which resource in the DSP section is used to conduct processing relating to each component and wire indicated in the CAD data (when the compilation is never conducted, the assignment data may not exist in the configuration data).

The assignment data is created, for each condition being selected as a target at the time of compilation, by assigning the hardware resource of the DSP section to each component and wire indicated in the CAD data based on the contents of the model database and the DSP resource database. Each piece of assignment data is composed of condition data indicating which condition is used to perform the assignment and data concretely indicating the hardware resource assigned to each of the component and wire.

The component assignment data indicates data regarding one component, and is provided for each component indicated in the CAD data. More concretely, the component assignment data specifies an ID of DSP which executes signal processing relating to the relevant component, a processing step position indicating which step during one sampling period is used to execute the processing, and data of a RAM address indicating an address of RAM (and an ID of RAM unit) to be used in performing the processing, by corresponding the above pieces of data to the unique ID of the relevant component.

Regarding the hardware resource assigned to the wire, a transmission channel, a signal line, a RAM address or the like to be used for the signal transmission relating to each of the wire is indicated. When signals are transmitted to different DSP units, the transmission channels or the signal lines are used, and when signals are transmitted in the same DSP unit, the transmission is conducted by writing data into a specific address of the RAM, and such that, a transmission path to be used may differ depending on cases. In this case, the hardware resource assigned to each of the wire is indicated so that the kind of transmission path to be used can be distinguished.

The pieces of data described above are main data to be used on the PC 30 side. The pieces of data may be stored in a non-volatile memory such as an HDD (hard disk drive) and read out into the RAM for use when required. Further, after executing the compilation, the configuration data including the created assignment data is preferably stored as an archive file in a tar format or the like separately from the configuration data stored in the PC 30. In particular, the archive file is preferably stored in the aforementioned portable memory to be carried away to the outside. It is of course possible to design such that the archive file can be transferred to an external device such as the mixer engine 10 through a communication path of some kind.

The archive file or configuration data is second configuration data, and a memory storing the data is a second memory.

Further, the PC 30 stores not only the above data but also current scenes being currently effective setting data in the currently effective configuration. A memory storing the current scenes is a current memory.

The current scene is constructed as an aggregate of component scenes relating to each component included in the configuration of signal processing which is being currently edited. Accordingly, when the configuration is changed, the construction of current scene is also changed according thereto. Further, when a control parameter of one component in the configuration is edited using the control panel or the like, the edit is performed by changing the value of the parameter of the one component in the current scene. The edit result can be saved as a scene in the configuration data indicating the configuration which is being edited.

Figure 7:
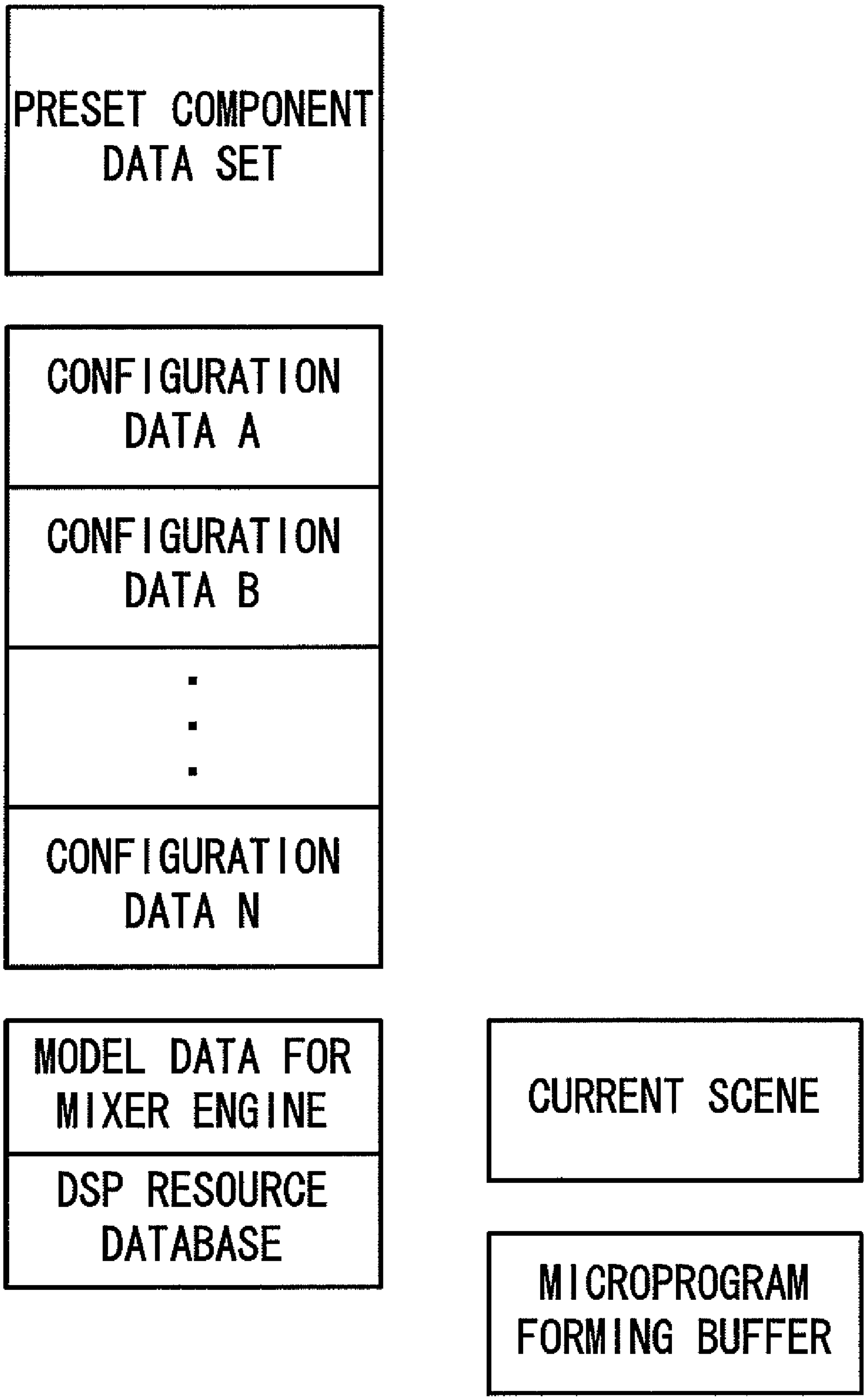
FIG. 7 is a diagram similarly showing a configuration of data to be used on the mixer engine side.

Next, FIG. 7 shows a configuration of data to be used on the mixer engine 10 side. The data shown in the drawing is stored in the flash memory 12 or the RAM 13.

As shown in the drawing, a preset component data set and configuration data are stored also on the mixer engine 10 side as main data.

Among them, the preset component data set may be exactly the same as the data stored on the PC 30 side. Note that when the preset component set-version differs between on the PC 30 side and on the mixer engine 10 side, the type and version of the preset component included in the preset component set also differ in accordance with the version. However, it is possible to grasp the correspondence between the preset component on the mixer engine 10 side and the preset component on the PC 30 side based on IDs and versions of the preset components.

Among the respective pieces of preset component data shown in FIG. 5, a part of the display and edit routine and the display data for PC are not used on the mixer engine 10 side, and accordingly the data may be removed for compressing the amount of data. However, if the pieces of data exist on the mixer engine 10 side, there arises no particular problem.

Further, as shown in FIG. 5, each piece of the preset component data includes the microprogram. A memory storing the microprogram is a program memory.

A format of the configuration data may also be exactly the same as that of the configuration data stored on the PC 30 side. Although the configuration data shown in FIG. 5 includes data which is not used on the mixer engine 10 side such as the display data for PC regarding the component and wire, there is no particular problem if such data remains in the configuration data on the mixer engine 10 side.

Note that the configuration data stored in the mixer engine 10 can be obtained by decompressing any archive file generated by the PC 30 and read from a recording medium or received via a communication path. Accordingly, the number and contents of configuration data stored in the mixer engine 10 do not always coincide with those of the configuration data in the connected PC 30. However, also regarding the configuration data, it is possible for the mixer engine 10 and the PC 30 to grasp the correspondence between the data on the mixer engine 10 side and the data on the PC 30 side based on IDs and versions of the data.

A memory storing the configuration data is a configuration data memory on the mixer engine 10 side.

Note that the mixer engine 10 is a device for processing audio signals based on the configuration of signal processing edited in the PC 30. Therefore, the CPU 11 is designed to form the microprogram to be executed in the DSP section 20 based on the configuration data used for the signal processing, and a microprogram formation buffer is prepared as a working area for the formation.

In the formation processing of microprogram, the CPU 11 of the mixer engine 10 sequentially reads the microprogram from the preset component data specified by the component ID and the component version of each component included in the CAD data in the configuration data.

Subsequently, based on the assignment data regarding the condition (a model of the mixer engine itself, a sampling frequency or the like) which matches the contents of signal processing to be executed hereafter among the assignment data included in the configuration data, each of the read microprograms is written into the microprogram formation buffer so that the microprograms can be executed by an appropriate DSP at an appropriate timing. At this time, a setting of parameters and a processing on the program are conducted according to need. Further, in accordance with the assignment data regarding the wires, a setting of transmission channel and a transmission RAM address is performed so that signal data can be appropriately transferred between the microprograms.

Subsequently, when the writing and setting of the microprogram are finished with respect to all the components and wires included in the CAD data, the microprogram to be given to the DSP section 20 completes.

Note that the mixer engine 10 here is configured such that it can perform the compilation of CAD data prior to the formation of microprogram when appropriate assignment data does not exist in the configuration data, but, such configuration is not a must.

Further, the mixer engine 10 includes, as data to be used for the compilation, model data for the mixer engine 10 itself being data regarding a hardware resource provided to the mixer engine 10, and a DSP resource database. These data is in the same format as the model database and the DSP resource database shown in FIG. 5, and indicates the processing capabilities of the mixer engine 10.

Note that in case of the mixer engine 10, even if a model thereof is fixed, usable resources are changed because of the sampling frequency or the option construction, so that there may be a plurality of pieces of DSP resource data to be prepared in the model data for the mixer engine 10 itself.

Further, as shown in FIG. 7, the current scene is provided also on the mixer engine 10 side. The structure of the current scene is the same as that of the scene included in the configuration data to be used for the signal processing. Through the operation from the user, the contents of either scene can be stored in the current scene, and a parameter of the scene can be reflected on the contents of signal processing. Further, it is also possible to edit the contents of current scene through the operation of the controls 15.

Next, description will be given regarding processing to be executed by the PC 30 and the mixer engine 10 described above. Among the processing to be described hereinbelow, processing on the PC 30 side is realized when the CPU 31 executes the edit program, and processing on the mixer engine 10 side is realized when the CPU 11 executes a required control program.

Figure 8:
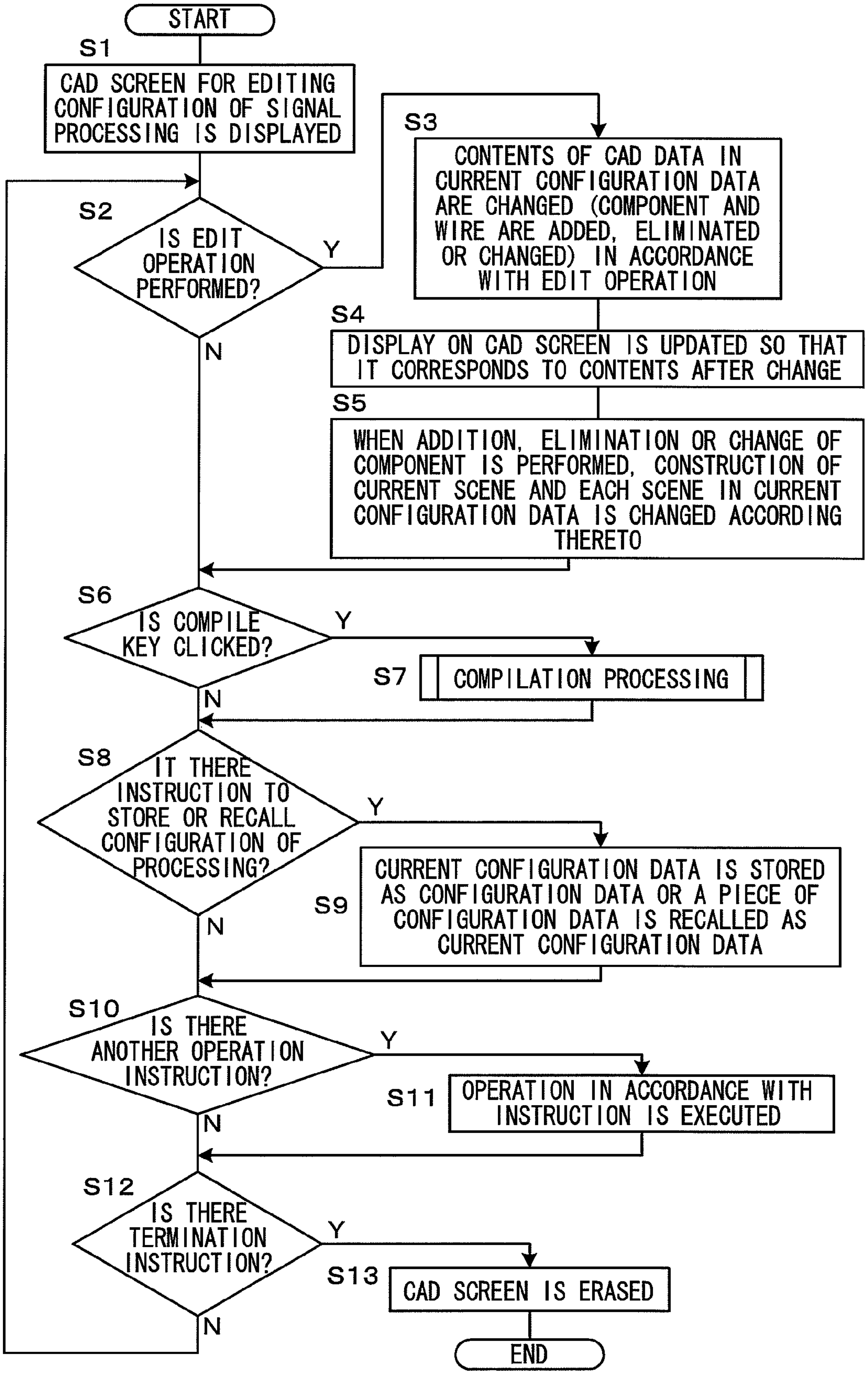
FIG. 8 is a flowchart showing main processing when an edit program is executed in the PC shown in FIG. 1.

First, FIG. 8 shows a flowchart of main processing which is constantly executed by the PC 30 during the operation of the edit program.

When an execution of edit program is instructed from a user, the CPU 31 starts processing shown in the flowchart of FIG. 8. Through this processing, a function of editing the configuration of signal processing conducted in the mixer engine 10 is realized.

In the processing, the CPU 31 firstly displays the CAD screen 40 as shown in FIG. 3 for editing the configuration of signal processing on the display device 34*a* in step S1. Thereafter, the CPU 31 accepts an instruction regarding the edit operation, clicking of the compile button 41, storing or recalling of the configuration, and so on, and conducts processing in accordance with the accepted instruction through steps S2 to S12. Subsequently, when the CPU 31 detects an instruction regarding the termination of edit program, the processing proceeds from step S12 to step S13, and the CPU 31 erases the CAD screen 40 and terminates the processing.

As above, the edit program is a program for making the CPU accept, from the OS, various events including the operation by the user and perform operations in accordance with the events, to thereby realize various functions including the edit of the configuration of signal processing to be performed in the mixer engine 10. However, if the processing for realizing these functions is explained in detail, the description becomes complicated. For this reason, description will be made hereinbelow regarding only the processing to be executed when the user performs the edit operation of the configuration of signal processing and when the compile button 41 is clicked, and description regarding the other processing will be omitted.

First, the processing to be executed when the edit operation is performed (YES in S2) is the processing shown in steps S3 to S5. The edit operation referred here indicates an addition, elimination or change of components or wires with respect to the configuration of signal processing. When this operation is performed, the CPU 31 firstly changes the contents of CAD data in the current configuration data shown in FIG. 6 in accordance with the edit operation (S3), and thereafter, updates the display on the CAD screen 40 so that it corresponds to the contents after the edit (S4). Further, if the addition, elimination or change of the component is performed, the CPU 31 adds, eliminates or changes the component scene thereto for each scene in the current scene and the current configuration data, to thereby change the construction of the scenes (S5).

When the compile button 41 is clicked, the CPU 31 performs compilation processing in which the CAD data included in the current configuration data is compiled in accordance with each target condition being selected on the target selection screen 50 shown in FIG. 4 (S7).

Figure 9:
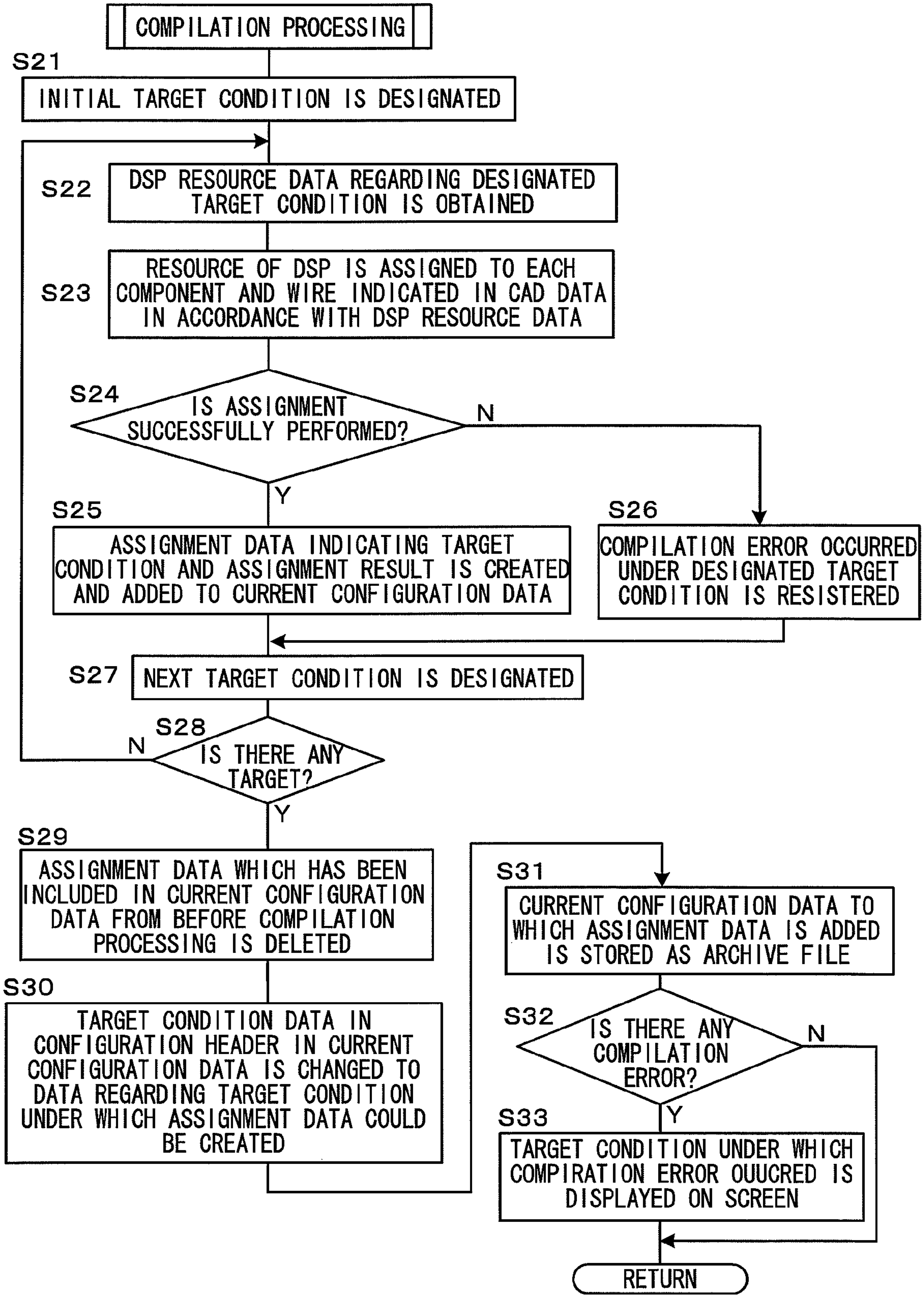
FIG. 9 is a flowchart showing compilation processing shown in FIG. 8.

FIG. 9 shows a flowchart of the compilation processing.

In the processing, the CPU 31 sequentially designates each target condition being selected on the target selection screen 50 as a processing target through steps S21, S27 and S28, and repeatedly performs the processing of steps S22 to S26 on the designated target. The processing of steps S22 to S26 is the processing for performing the compilation of CAD data according to one condition.

Concretely, at first, the CPU 31 refers to the model database and the DSP resource database shown in FIG. 5, and obtains the DSP resource data regarding the designated target (S22). Thereafter, the CPU 31 assigns the resource of DSP to each component and wire indicated in the CAD data to be compiled in accordance with the DSP resource data obtained in step S22 (S23).

The number of steps and the amount of memory required when the DSP performs the processing relating to each component are obtained by searching the DSP resource database based on the component ID and the component version in the component data included in the CAD data. Accordingly, it is only required to sequentially assign the steps which are not yet assigned and the DSP which still has a sufficient amount of memory to the component based on the required number of steps and amount of memory. Similarly, it is only required to assign transmission channel(s) of the waveform bus or resister(s) for signal transmission to the wire depending on whether the transmission is performed within the same DSP or between different DSPs, after deciding which DSP is used to perform the processing relating to the components at both ends of the wire.

Note that there is no problem in particular if the assignment is conducted in such a manner that the processing relating to the component being the signal output source is performed at a timing later than the timing at which the processing relating to the component being the signal output destination is performed within a sampling period. However, in this case, a signal outputted from the component being the output source is to be processed in the component being the output destination in the next sampling period. For this reason, a delay of one sampling period will occur in the processing. Further, when the signal transmission is performed through the waveform bus, a delay of two sampling periods will occur in the processing because of the transmission.

Subsequently, when the above-described assignment is successfully performed (YES in S24), namely, when the resource can be assigned to all the components and wires, the CPU 31 creates assignment data indicating a target condition and an assignment result at this time and adds the assignment data to the current configuration data (S25). A format of the assignment data is as shown in FIG. 6. Further, when the assignment is failed, the CPU 31 registered a compilation error which occurred under the designated target condition (S26). In this case, the CPU 31 does not add an assignment data to the current configuration data.

Note that when the amount of resource required for performing the signal processing is close to the amount of available resource under the target condition, even if the total amount of resource falls within a range of the amount of DSP resource under the target condition, there is a possibility that the resource cannot be assigned to all the components and wires depending on an order of performing the assignment. Therefore, even if the assignment fails, the assignment is preferably retried several times while changing the order.

When the creation of assignment data or the storage of compilation error is completed for all the targets selected on the target selection screen 50 shown in FIG. 4 through the above processing, it becomes YES in step S28. Subsequently, the processing proceeds to step S29, and the CPU 31 deletes the assignment data which has been included in the current configuration data from before the compilation processing. The assignment data deleted here is normally the data created at the time of previous compilation processing. As will be described later in detail, the assignment data created at the time of previous compilation processing may be referred to when the assignment is executed in step S23, so that it is left up to this point. However, it is also possible to configure such that the compilation can be performed without referring to the assignment data formed at the time of previous compilation processing based on the user's selection, as will be described later.

Thereafter, the CPU 31 changes target condition data in the configuration header in the current configuration data to data which indicates the target condition under which the assignment data could be created (S30). At this point, the assignment data in the current configuration data is only the data added in step S25 through the compilation processing at this time, in which as the target condition data, the condition used for generating the assignment data is written.

After that, the CPU 31 stores the configuration data to which the assignment data is added as an archive file in a tar format or the like (S31). A destination for storing the archive file is preferably a detachable non-volatile memory, but, it may be a built-in memory such as an HDD.

After the above processing, when the compilation error is registered in step S26 (YES in S32), the CPU 31 displays the target condition under which the compilation error occurred on the screen to thereby notify the error to the user (S33), and the compilation processing is terminated to return to the processing in FIG. 8. When there is no compilation error, the processing directly returns to the processing in FIG. 8.

In the above-described compilation processing, the CPU of the PC 30 serves as a compilation device.

Further, with the use of the archive file generated in the compilation processing, it is possible to make any mixer engines satisfying the used target condition read the file and execute the signal processing in accordance with the configuration of signal processing edited in the PC 30. Namely, if the compilation is performed under selection of a plurality of models as the target conditions, it is possible to obtain an archive file with which the common signal processing can be executed by the plurality of models of mixer engines.

Note that the assignment data formed at the time of previous compilation processing may be left without being deleted in step S29. In this case, an archive file in which the assignment data newly created at the compilation processing is added to the previous assignment data is to be generated. Accordingly, also in step S30, the target condition data formed at the time of previous compilation processing may be left and data on the target condition regarding the newly created assignment data may be added to the previous data.

Further, the assignment in step S23 can also be conducted from the beginning each time the compilation is performed, without referring to the existing assignment data (batch compilation). However, it is also possible that the assignment regarding only a part where the configuration of the signal processing is changed from the configuration at the time of the compilation of the existing assignment data is performed, by referring to the existing assignment data (incremental compilation).

The assignment data referred to at this time is one created under the same target condition as the condition presently designated. The components and wires included in the referred assignment data and the components and wires included in the CAD data to be compiled are compared, and for the part in which the configurations match, the contents of referred assignment data are directly applied. The components are compared based on the unique IDs, and the data on the wire is applied only when the components at both ends of the wire match. Regarding the part in which the configurations do not match, the contents of referred assignment data are not applied, and the assignment of resource may be newly performed on the components and wires included in the CAD data to be compiled.

In the incremental compilation, a part to be changed from the assignment data formed at the time of previous compilation is deleted and rewritten. Accordingly, if repeatedly performing the incremental compilation by changing the configuration of signal processing many times, a fragmentation in which resource being assigned to any of the components or wires is minutely dispersed into resource not yet being assigned may occur during the assignment, resulting that the efficiency of the assignment may be lowered. On the other hand, if the batch compilation is applied to perform the assignment again, there is a possibility that the processing order of each component or the DSP unit being an assignment destination is changed in spite of the same configuration of signal processing, resulting that the amount of delay occurring between the components may be changed. Therefore, in order to maintain not only the amount of delay but also the order of processing to be actually executed by the DSP on an unedited part, the application of incremental compilation is effective.

As above, the batch compilation and the incremental compilation have both merits and demerits, so that preferably the user can select which method is taken. In this case, the selection may be made for each target condition.

Incidentally, when the audio signal processing in accordance with the configuration of signal processing edited on the PC 30 side is executed by the mixer engine 10, it is only required to make the mixer engine 10 read the archive file generated in the processing shown in FIG. 9. There is provided a function, on the mixer engine 10 side, of reading necessary data from the archive file to performing a setting necessary for conducting the audio signal processing.

Figure 10:
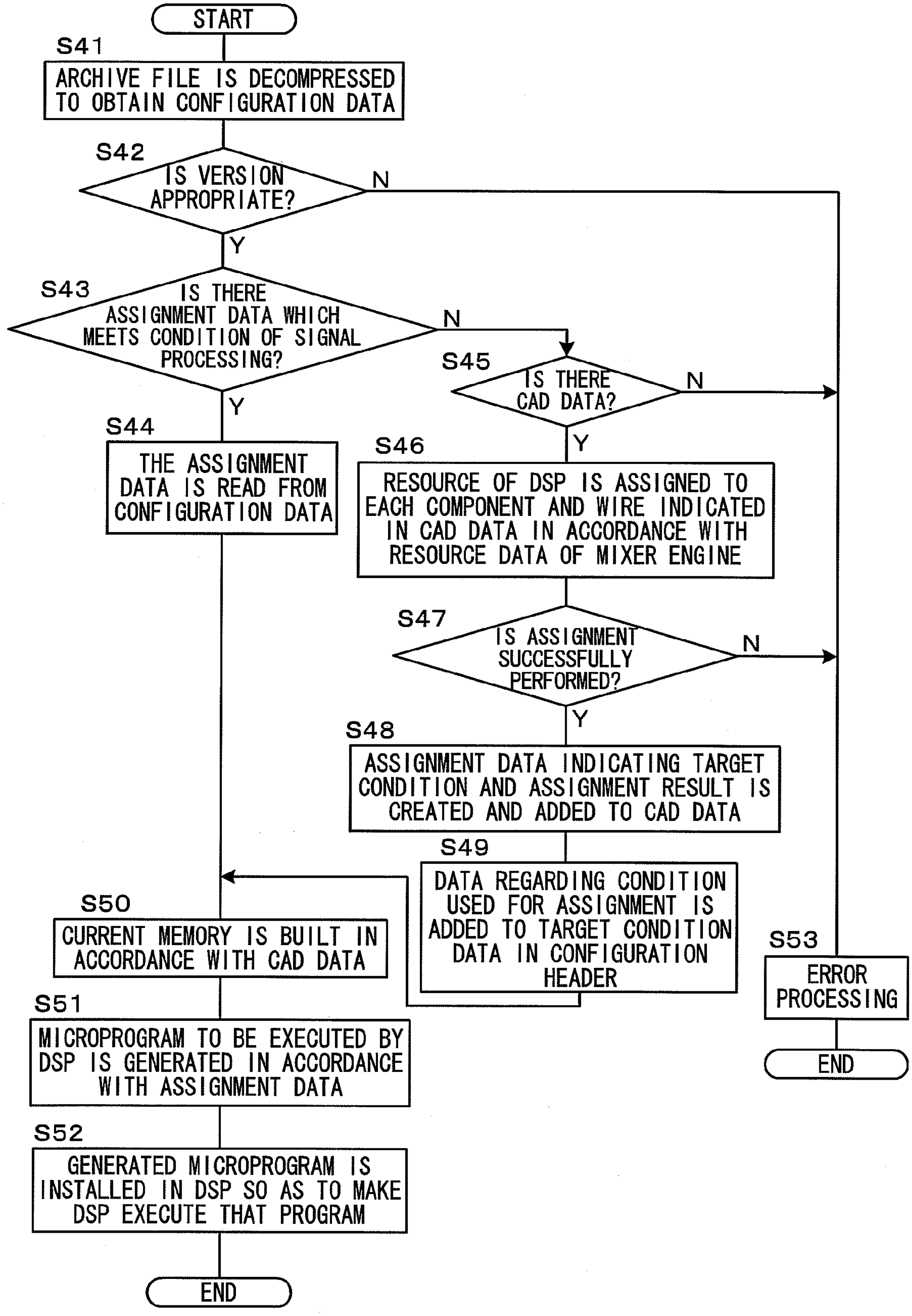
FIG. 10 is a flowchart of processing executed by a CPU of the mixer engine shown in FIG. 1 for reading necessary data from an archive file and performing a setting to conduct audio signal processing.

FIG. 10 shows a flow chart of processing relating to the function.

Upon determining that reading the archive file is instructed based on detection of events such that the archive file is transmitted together with the reading instruction from an external device, the portable memory storing the archive files is connected, one of a plurality of archive files stored in the connected portable memory is selected by the user and is instructed to be read, an archive file or one piece of the configuration data previously stored in the flash memory 12 is selected by the user and is instructed to be read, or the like, the CPU 11 of the mixer engine 10 starts the processing shown in the flowchart of FIG. 10.

Note that in the processing, even if the data to be reflected on the processing of the DSP section 20 is either the archive file or the decompressed configuration data, the data can be handled by the same processing except the presence/absence of the decompressing processing. Further, the aforementioned reading instruction may be construed as an instruction to execute signal processing relating to a new configuration of signal processing in accordance with the read archive file.

In the processing shown in FIG. 10, the CPU 11 firstly decompresses the archive file to be reflected on the processing of the DSP section 20 to obtain the configuration data (S41). Subsequently, based on the system version data included in the configuration header in the configuration data, the CPU 11 compares a version of the program included in the mixer engine 10 with a version of the edit program in the PC 30 in which the archive file is generated (S42).

Here, when the version of the edit program is more recent, there is a possibility that the mixer engine 10 is not provided with a program necessary for executing the signal processing in accordance with the configuration data, so that the CPU 11 judges that the version is inappropriate (NO in S42), displays the inappropriateness of the version on the display 14 to notify to the user (S53), and terminates the processing.

Meanwhile, if the versions are the same or the version in the mixer engine 10 is more recent, the operation proceeds to the next processing (YES in S42).

Subsequently, the CPU 11 judges whether or not there is the assignment data, in the configuration data, regarding the target condition which meets the condition of signal processing to be executed (S43). Here, among the conditions of signal processing, the one regarding the model of device which executes the processing cannot be changed on the mixer engine 10 side. However, the conditions regarding the sampling frequency and the like, namely, the conditions except the one regarding the model may be determined on the mixer engine 10 side. Specifically, although a value previously set in the mixer engine 10 can be used, it may be possible to accept the selection of condition from predetermined candidates at the processing in step S43 or to select the condition automatically or manually from candidates regarding which the assignment data exists in the configuration data.

In either case, if there exists appropriate assignment data in step S43, the CPU 11 reads the assignment data from the configuration data (S44). Subsequently, the CPU 11 build the current memory in accordance with the CAD data in the read configuration data (S50), and forms the microprogram to be executed in the DSP section 20 in the microprogram formation buffer in accordance with the read assignment data and the CAD data (S51).

Thereafter, by installing the generated microprogram in the DSP section 20 so as to make the DSP section 20 execute the program (S52), the CPU 11 constructs a state where the signal processing is executed in accordance with the configuration of signal processing indicated in the configuration data (CAD data included therein), and terminates the processing.

Note that a formation procedure of the microprogram is as described in the explanation of FIG. 7. Further, the contents of current memory may be set at predetermined default values or recalled contents of either scene included in the configuration data.

In the processing so far, the CPU 11 serves as an assignment data selecting device in step S44, and it serves as a program forming device in step S51.

Meanwhile, if there exists no appropriate assignment data in step S43, the processing proceeds to step S45 and thereafter.

Here, the CPU 11 firstly judges whether or not there exists the CAD data in the configuration data (S45). This judgment normally results in YES, but, it may results in NO when appropriate configuration data is not obtained for some reason. In this case, error processing (S53) for warning to the user that the appropriate configuration data is not obtained is performed and the processing is terminated.

Meanwhile, if it is YES in step S45, the CPU 11 assigns the resource of the DSP section 20 to each component and wire indicated in the CAD data included in the configuration data in accordance with the resource data of the mixer engine 10 using the same algorithm as that used in step S23 in FIG. 9 (S46). What is referred to in this step is the model data for the mixer engine 10 itself and the DSP resource database shown in FIG. 7. Further, the conditions except the one regarding the model are appropriately determined in the same manner as in the case of the determination in step S43.

When the assignment is successfully performed, the CPU 11 creates the assignment data indicating the target condition and the assignment result and adds the assignment data to the CAD data (S47, S48). Further, the CPU 11 adds the data on the target condition used for the assignment to the target condition data in the configuration header (S49). Subsequently, the processing proceeds to step S50 and thereafter, in which the CPU 11 performs the building of the current memory, the generation and installation of the microprogram. The assignment data used here is the one created in step S48.

In the processing so far, the CPU 11 serves as a second compilation device in steps S46 to S49.

When the assignment is failed in step S47, the CPU 11 performs an error processing (S53) for warning to the user of the assignment failure, and terminates the processing.

According to the above-described processing, it is possible that the mixer engine 10 forms the program for making the DSP section 20 perform the signal processing in accordance with the configuration of signal processing defined by the read archive file (or configuration data, which applies to the description hereinbelow unless otherwise stated), and makes the DSP section 20 execute the program. Accordingly, by inputting appropriate waveform data from the waveform I/O 19 after the aforementioned processing, it is possible to make the DSP section 20 execute the signal processing in accordance with the contents of the archive file to thereby obtain an output of the processed waveform data.

In this case, if an assignment data regarding an appropriate target condition is included in the archive file, there is no necessity for performing compilation again on the mixer engine 10 side. Therefore, if the archive file is read into the mixer engines at different time or individuals of the device which reads the archive file are different, as long as the mixer engines can perform the processing under the same condition, they can execute the signal processing under exactly the same condition including the fragmentation and delay occurrence situation. Further, since there is no necessity for performing the compilation on the mixer engine 10 side, the mixer engine 10 can start the signal processing in a short period of time. This effect can be similarly obtained even when the compilation is performed with respect to one target condition and there exists only one piece of assignment data in the configuration data.

Even if the processing condition regarding a model or the like is different among the devices which read the archive file, the devices can execute the signal processing under the same condition with respect to components and wires, although it is not possible to guarantee the total match including the fragmentation and delay occurrence situation.

Further, even if the archive file is read into a mixer engine of a model which was not considered at the time of its generation, since the assignment data in accordance with the hardware configuration of the mixer engine itself can be newly formed on the mixer engine side, the mixer engine can perform the signal processing with no problem.

In addition, if it is designed such that the newly formed assignment data can be added to the archive file to be stored, it becomes possible to use the archive file in the same model of mixer engine without performing the compilation after the addition and store. If the assignment data is used when the same signal processing is executed later, it is of course possible to reproduce the signal processing under the condition same as the condition under which the initial compilation is performed including the fragmentation and delay occurrence situation.

Note that although the processing in which the CAD data to which the assignment data was added in step S49 is made to be the archive file is not illustrated in an example shown in FIG. 10, it is of course possible to conduct the processing. Further, it may also be possible that the configuration data obtained in steps S41 or S49 is stored in the flash memory 12 or the like and is outputted later as the archive file.

The above is all the description of this embodiment. It is needless to say that the configuration of device, concrete processing steps, contents and use of the screen to be displayed, data format and the like are not limited to those explained concretely in the above-described embodiment in the invention.

For instance, it is also possible to consider the delay in the signal processing described in step S23 in FIG. 9 when assigning the resource to the components and wires. As described above, in the signal processing executed by the DSP section 20, a different amount of delay occurs in the transmission of signals via wires depending on which DSP is used to process components before and behind the wire at which timing. Accordingly, even if the same wire is used, there is a possibility that the amount of the delay differs from the previous one when the compilation is performed again.

Meanwhile, if the amount of delay with respect to all the wires is set to be the envisaged maximum amount of delay (two sampling periods in this case), such a problem does not occur. In order to realize the above, regarding the wire in which the actual amount of delay is small, a delay as much as the difference between the actual amount of delay and an adjustment target value may be added before or after the wire.

However, if such an automatic adjustment is performed, the hardware resource is additionally consumed by the amount of delay to be added, so that the presence/absence of the automatic adjustment is preferably selectable by the user. Further, the presence/absence of the automatic adjustment of delay is preferably included in the item of the target condition.

If the item of the target condition such as the model, the sampling frequency and the automatic adjustment of delay is increased, the number of combinations of items becomes vast, resulting that it becomes difficult to list all the combinations on the target candidate display portion 51 shown in FIG. 4.

Figure 11:
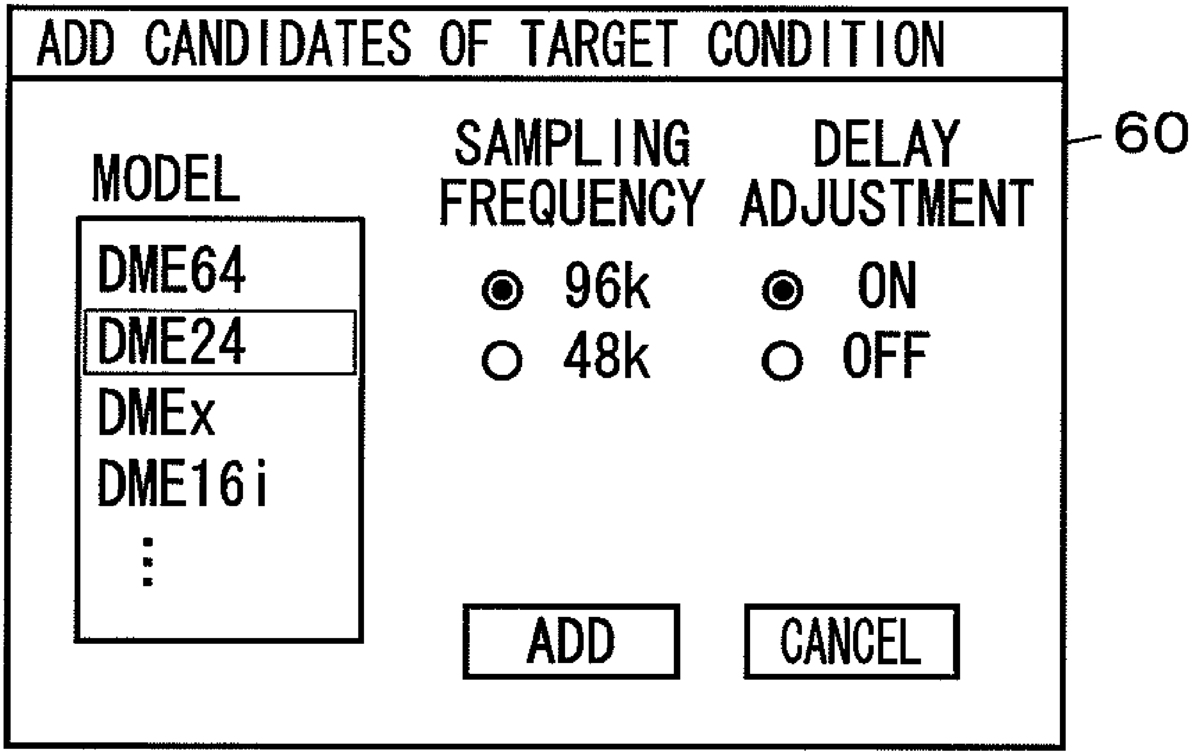
FIG. 11 is a diagram showing a display example of a condition candidate setting screen.

Accordingly, it is also conceivable that candidates of the target condition can be registered using a condition candidate setting screen 60 such as shown in FIG. 11, and a condition to be actually used as the target condition is selected from the previously registered candidates on the target selection screen 50.

As another modification, it is possible not to provide the function of performing the processing of steps S45 to S49 in FIG. 10, namely, the compilation function on the mixer engine 10 side in the aforementioned embodiment. In this case, it is only required to give, if it is NO in step S43, a warning indicating that there exists no appropriate assignment data in step S53. If the archive file in accordance with the mixer engine with which the processing is executed is previously prepared, there is no problem in adopting the above configuration.

Further, if the above configuration is adopted, the target condition data is preferably described not only in the configuration header but also in the header of the archive file. If it is adopted, the presence/absence of the appropriate assignment data can be grasped before decompressing the file, so that when there exists no appropriate assignment data, it is possible to proceed to the error processing without conducting unnecessary decompressing processing.

As still another modification, the configuration of mixer system is not limited to that shown in FIG. 1, and not the PC 30, but a dedicated editing device or control device can also be used as the editing device. The number of audio signal processing devices is not limited to one, and a plurality of devices may be simultaneously connected to the editing device. Further, even if the PC and the mixer engine are not connected at all, the effect of the present invention can be obtained.

Further, the mixer engine 10 in the aforementioned embodiment may be a digital mixer provided with a plurality of channel strips. Furthermore, the PC 30 and the mixer engine (or digital mixer) need not be provided individually but may be provided as an integral device in which the both are housed in one housing. In this case, the CPU 11, the RAM 13, the display 14, the controls 15 and the like of the mixer engine (or digital mixer) and the CPU 31, the RAM 33, the display device 34*a*, the control device 35*a* and the like of the PC 30 may share the same hardware.

Further, the configurations of the embodiment and the modified examples described above are applicable in any combination in a range without contradiction.

As apparent from the above description, according to the editing device and the audio signal processing device of the invention, when the audio signal processing device having the programmable signal processor executes the signal processing in accordance with the configuration of signal processing edited by the editing device, it is possible to enable the data regarding the configuration generated by the editing device to be easily shared by a plurality of models of mixer engines. Further, it is also possible to enable the mixer engine to read the data regarding the configuration and start the signal processing in a short period of time.

What is claimed is:

1. An editing device that edits a configuration of signal processing comprising a plurality of components each having an input terminal or an output terminal and wires each connecting the output terminal and the input terminal of the components executed by an audio signal processing device having a programmable signal processor, said editing device comprising:

- a device that causes a display to display a screen with which the configuration is edited;
- a device that accepts a designation of the components and wires between the components on the screen and changes display contents of the screen in accordance with the designation;
- a first memory that stores data regarding the edited configuration as first configuration data including data on the components and wires included in the configuration;
- a second memory that stores, for each of a plurality of audio signal processing devices which execute the signal processing according to the edited configuration, resource data indicating a signal processing resource of the signal processor provided in the audio signal processing device;
- a selection accepter that accepts a selection of an arbitrary number of audio signal processing devices among the audio signal processing devices regarding which a piece of resource data is stored in said second memory; and
- a compilation device that assigns the signal processing resource of the signal processor of the audio signal processing device to processing corresponding to each of the components and wires included in the edited configuration in accordance with the resource data stored in said second memory, and generates second configuration data including not only the data on the components and wires but also assignment data indicating contents of the assignment and model data indicating that the assignment data is generated in accordance with the resource data of which device,
- wherein said compilation device individually generates, for each of all the audio signal processing devices regarding which said selection acceptor accepted the selection, the assignment data in accordance with the resource data of each of the devices and generates the second configuration data including all the pieces of the generated assignment data.

2. An editing device that edits a configuration of signal processing comprising a plurality of components each having an input terminal or an output terminal and wires each connecting the output terminal and the input terminal of the components executed by an audio signal processing device having a programmable signal processor, said editing device comprising:

- a device that causes a display to display a screen with which the configuration is edited;
- a device that accepts a designation of the components and wires between the components on the screen and changes display contents of the screen in accordance with the designation;
- a first memory that stores data regarding the edited configuration as first configuration data including data on the components and wires included in the configuration;
- a second memory that stores, for each of a plurality of audio signal processing devices which execute the signal processing according to the edited configuration, resource data indicating a signal processing resource of the signal processor provided in the audio signal processing device;
- a selection accepter that accepts a selection of an arbitrary audio signal processing device among the audio signal processing devices regarding which a piece of resource data is stored in said second memory; and
- a compilation device that assigns the signal processing resource of the signal processor of the audio signal processing device to processing corresponding to each of the components and wires included in the edited configuration in accordance with the resource data stored in said second memory, and generates second configuration data including not only the data on the components and wires but also assignment data indicating contents of the assignment and model data indicating that the assignment data is generated in accordance with the resource data of which device,
- wherein said compilation device generates the assignment data in accordance with the resource data of the audio signal processing device regarding which said selection accepter accepted the selection, and generates the second configuration data including the assignment data.

3. An audio signal processing device having a programmable signal processor and performing signal processing on inputted audio signals in accordance with the second configuration data generated by said editing device according to claim 1 to output the processed signals, said audio signal processing device comprising:

a configuration data memory that obtains and stores the second configuration data;

a program memory that stores a program for making the programmable signal processor perform signal processing corresponding to each of components used in editing the signal processing in said editing device; and a controller that controls the signal processing in the programmable signal processor based on one piece of the second configuration data stored in said configuration data memory, wherein said controller comprising:

an assignment data selecting device that selects, in accordance with model data included in the second configuration data used for controlling the signal processing, assignment data indicating contents of assignment in accordance with resource data indicating a signal processing resource of the programmable signal processor of the audio signal processor itself among assignment data included in the second configuration data;

a program forming device that forms a program for making the programmable signal processor perform, using the signal processing resource indicated by the assignment data selected by said assignment data selecting device, signal processing according to the configuration data based on the program stored in said program memory; and a device that makes the programmable signal processor execute the program formed by said program forming device.

4. An audio signal processing device according to claim 3, further comprising:

a resource data memory that stores the resource data indicating the signal processing resource of the programmable signal processor of the audio signal processing device itself;

a second compilation device that assigns, when the assignment data indicating the contents of assignment in accordance with the resource data indicating the signal processing resource of the programmable signal processor of the audio signal processing device itself cannot be selected by said assignment data selecting device, the signal processing resource of the programmable signal processor of the audio signal processing device itself to processing corresponding to each of components and wires indicated by the data on the components and wires included in the second configuration data in accordance with the resource data stored in said resource data memory and generates assignment data indicating contents of the assignment; and a device that makes said program forming device form the program based on the assignment data generated by said second compilation device.

5. An audio signal processing device according to claim 4, further comprising a device that adds, when said second compilation device generates the assignment data, the generated assignment data to the second configuration data used for controlling the signal processing and adds data regarding the audio signal processing device itself to the model data included in the second configuration data.

6. An audio signal processing device having a programmable signal processor and performing signal processing on inputted audio signals in accordance with the second configuration data generated by said editing device according to claim 2 to output the processed signals, said audio signal processing device comprising:

a configuration data memory that obtains and stores the second configuration data;

a program memory that stores a program for making the programmable signal processor perform signal processing corresponding to each of components used in editing the signal processing in said editing device; and a controller that controls the signal processing in the programmable signal processor based on one piece of the second configuration data stored in said configuration data memory, wherein said controller comprising:

an assignment data selecting device that selects, in accordance with model data included in the second configuration data used for controlling the signal processing, assignment data indicating contents of assignment in accordance with resource data indicating a signal processing resource of the programmable signal processor of the audio signal processor itself among assignment data included in the second configuration data;

a program forming device that forms a program for making the programmable signal processor perform, using the signal processing resource indicated by the assignment data selected by said assignment data selecting device, signal processing according to the configuration data based on the program stored in said program memory; and a device that makes the programmable signal processor execute the program formed by said program forming device.

7. An audio signal processing device according to claim 6, further comprising:

a resource data memory that stores the resource data indicating the signal processing resource of the programmable signal processor of the audio signal processing device itself;

a second compilation device that assigns, when the assignment data indicating the contents of assignment in accordance with the resource data indicating the signal processing resource of the programmable signal processor of the audio signal processing device itself cannot be selected by said assignment data selecting device, the signal processing resource of the programmable signal processor of the audio signal processing device itself to processing corresponding to each of components and wires indicated by the data on the components and wires included in the second configuration data in accordance with the resource data stored in said resource data memory and generates assignment data indicating contents of the assignment; and a device that makes said program forming device form the program based on the assignment data generated by said second compilation device.

8. An audio signal processing device according to claim 7, further comprising a device that adds, when said second compilation device generates the assignment data, the generated assignment data to the second configuration data used for controlling the signal processing and adds data regarding the audio signal processing device itself to the model data included in the second configuration data.

* * * * *